US012736356B2

(12) United States Patent
Arai et al.

(10) Patent No.: US 12,736,356 B2
(45) Date of Patent: Sep. 15, 2026

(54) PARALLEL TRAVELING MANAGEMENT DEVICE AND PARALLEL TRAVELING MANAGEMENT METHOD

(71) Applicant: Mitsubishi Electric Corporation, Tokyo (JP)

(72) Inventors: Miki Arai, Tokyo (JP); Takayasu Hashimoto, Tokyo (JP); Misato Watanabe, Tokyo (JP); Dongsuk Park, Tokyo (JP); Yuri Kubota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/006,310

(22) Filed: Dec. 31, 2024

(65) Prior Publication Data

US 2025/0155248 A1 May 15, 2025

Related U.S. Application Data

(63) Continuation of application No. PCT/JP2022/027043, filed on Jul. 8, 2022.

(51) Int. Cl.
*G01C 21/34* (2006.01)
*G08G 1/01* (2006.01)
*G08G 1/052* (2006.01)

(52) U.S. Cl.
CPC ..... *G01C 21/3438* (2013.01); *G01C 21/3492* (2013.01); *G08G 1/0145* (2013.01); *G08G 1/052* (2013.01)

(58) Field of Classification Search
None
See application file for complete search history.

(56) References Cited

U.S. PATENT DOCUMENTS

2013/0035823 A1 2/2013 Yoshida
2016/0016663 A1* 1/2016 Stanek ................ G05D 1/0094 701/3

(Continued)

FOREIGN PATENT DOCUMENTS

DE 112018007150 T5 11/2020
JP 2002321828 A 11/2002

(Continued)

OTHER PUBLICATIONS

Farouk Hammami, The impact of optimizing delivery areas on urban traffic congestion, Oct. 1, 2020 (Year: 2020).*

(Continued)

*Primary Examiner* — Ismail A Manejwala
(74) *Attorney, Agent, or Firm* — XSENSUS LLP

(57) ABSTRACT

A parallel traveling management device includes: an order information acquisition unit to acquire information indicating an order of goods; a user vehicle arrival detection unit to detect that a user vehicle has arrived at a parallel traveling zone; a parallel traveling zone congestion situation detection unit to detect a congestion situation of the parallel traveling zone when the user vehicle has arrived at the parallel traveling zone; a route calculation unit to calculate on the basis of a detection result of the parallel traveling zone congestion situation detection unit traveling routes of the user vehicle and of a delivery vehicle at a time at which the goods are delivered; and a parallel traveling control unit to control parallel traveling of the user vehicle and the delivery vehicle on the basis of a calculation result of the route calculation unit, and instruct the delivery of the goods.

16 Claims, 11 Drawing Sheets

(56) References Cited

U.S. PATENT DOCUMENTS

| | | | | |
|---|---|---|---|---|
| 2020/0143295 | A1 | 5/2020 | Sakurada | |
| 2020/0301441 | A1 | 9/2020 | Murakami et al. | |
| 2021/0109546 | A1* | 4/2021 | Christiana | G05D 1/0684 |
| 2022/0044571 | A1 | 2/2022 | Luo et al. | |
| 2022/0366336 | A1* | 11/2022 | Khasis | G08G 1/04 |

FOREIGN PATENT DOCUMENTS

| | | | |
|---|---|---|---|
| JP | 2004338888 | A | 12/2004 |
| JP | 2005168085 | A | 6/2005 |
| JP | 2012121700 | A | 6/2012 |
| JP | 2015079453 | A | 4/2015 |
| JP | 2015-184821 | A | 10/2015 |
| JP | 2020-006949 | A | 1/2020 |

OTHER PUBLICATIONS

International Search Report and Written Opinion mailed on Sep. 27, 2022, received for PCT Application PCT/JP2022/027043, filed on Jul. 8, 2022, 12 pages including English Translation.

Office Action issued Sep. 24, 2025 in corresponding German Patent Application No. 11 2022 007 204.0 (10 pages).

* cited by examiner

FIG. 1

Central Management Device

Parallel Traveling Zone Device

Parallel Traveling Zone

Providing Route

1

2

3

4

5

6

4
7
3
4
7
3
3
7
4

3
4
7

7
3
4

3
7
4

3
7
4

PARALLEL TRAVELING MANAGEMENT DEVICE AND PARALLEL TRAVELING MANAGEMENT METHOD

CROSS-REFERENCE TO RELATED APPLICATION

This is a continuation application of PCT/JP2022/027043, filed on Jul. 8, 2022, the entire contents of which are incorporated herein by reference in their entirety.

TECHNICAL FIELD

The present disclosure relates to a parallel traveling management device and a parallel traveling management method that deliver goods by controlling parallel traveling of vehicles.

BACKGROUND ART

Conventionally, a drive-through has a determined route and position for delivering goods, and users cannot usually accept the goods unless the users stop vehicles at the determined place once. Hence, a conventional drive-through cannot dynamically change a delivery mode depending on an increase or a decrease in a demand or a personal request, and causes a waiting traffic jam.

On the other hand, there is known a system that delivers food and beverages using an unmanned aerial vehicle (see, for example, Patent Literature 1). The system disclosed in this Patent Literature 1 delivers food and beverages to users on a cart at a golf course using the unmanned aerial vehicle on which the food and the beverages are loaded by calculating a delivery route so as not to bother a competition. This system can implement a delivery service without a waiting time.

CITATION LIST

Patent Literature

Patent Literature 1: JP 2020-006949 A

SUMMARY OF INVENTION

Technical Problem

As described above, the system disclosed in Patent Literature 1 delivers food and beverages using the unmanned aerial vehicle. This system can implement a delivery service with a less waiting time. However, according to this system, too, a user needs to stop a car once, and accept food and beverages.

Furthermore, when the unmanned aerial vehicle is used, delivery is impossible in bad weather.

Furthermore, when the unmanned aerial vehicle is used, it is necessary to secure a place where the unmanned aerial vehicle can safely land. However, it is not easy to prepare a plurality of spots of such a place, and therefore a waiting traffic jam may occur due to waiting for unmanned aerial vehicles to land.

Furthermore, when an unmanned aerial vehicle is used, there is a high risk that a cargo is damaged or deteriorates. Hence, in this case, it is necessary to excessively pack the cargo, and a labor and a time of preparation for packing, unpacking, and the like are required for an actual operation.

The present disclosure has been made to solve the above problem, and an object of the present disclosure is to provide a parallel traveling management device that enables acceptance of goods while vehicles are moving without stopping once.

Solution to Problem

A parallel traveling management device according to the present disclosure includes: a processor; and a memory storing a program, upon executed by the processor, to perform a process: to acquire information indicating an order of goods; to detect that a user vehicle has arrived at a parallel traveling zone; to detect a congestion situation of the parallel traveling zone when the process detects that the user vehicle has arrived at the parallel traveling zone; to calculate on a basis of a detection result of the process a traveling route of the user vehicle and a traveling route of a delivery vehicle at a time at which the goods indicated by the information acquired are delivered; and to control parallel traveling of the user vehicle and the delivery vehicle on a basis of a calculation result of the process, and instruct the delivery of the goods.

Advantageous Effects of Invention

According to the present disclosure, the above configuration is employed, so that it is possible to accept goods while vehicles are moving without stopping once.

BRIEF DESCRIPTION OF DRAWINGS

FIG. 1 is a diagram illustrating a configuration example of a parallel traveling management system according to Embodiment 1.

DESCRIPTION OF EMBODIMENTS

Figure 2:
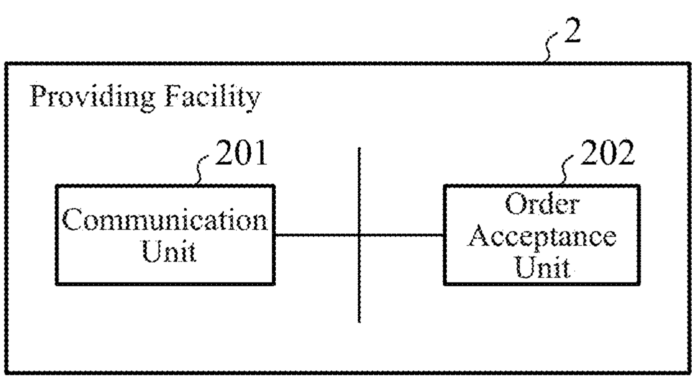
FIG. 2 is a diagram illustrating a configuration example of a providing facility according to Embodiment 1.

An embodiment will be described in detail below with reference to the drawings.

Embodiment 1

Figure 1:
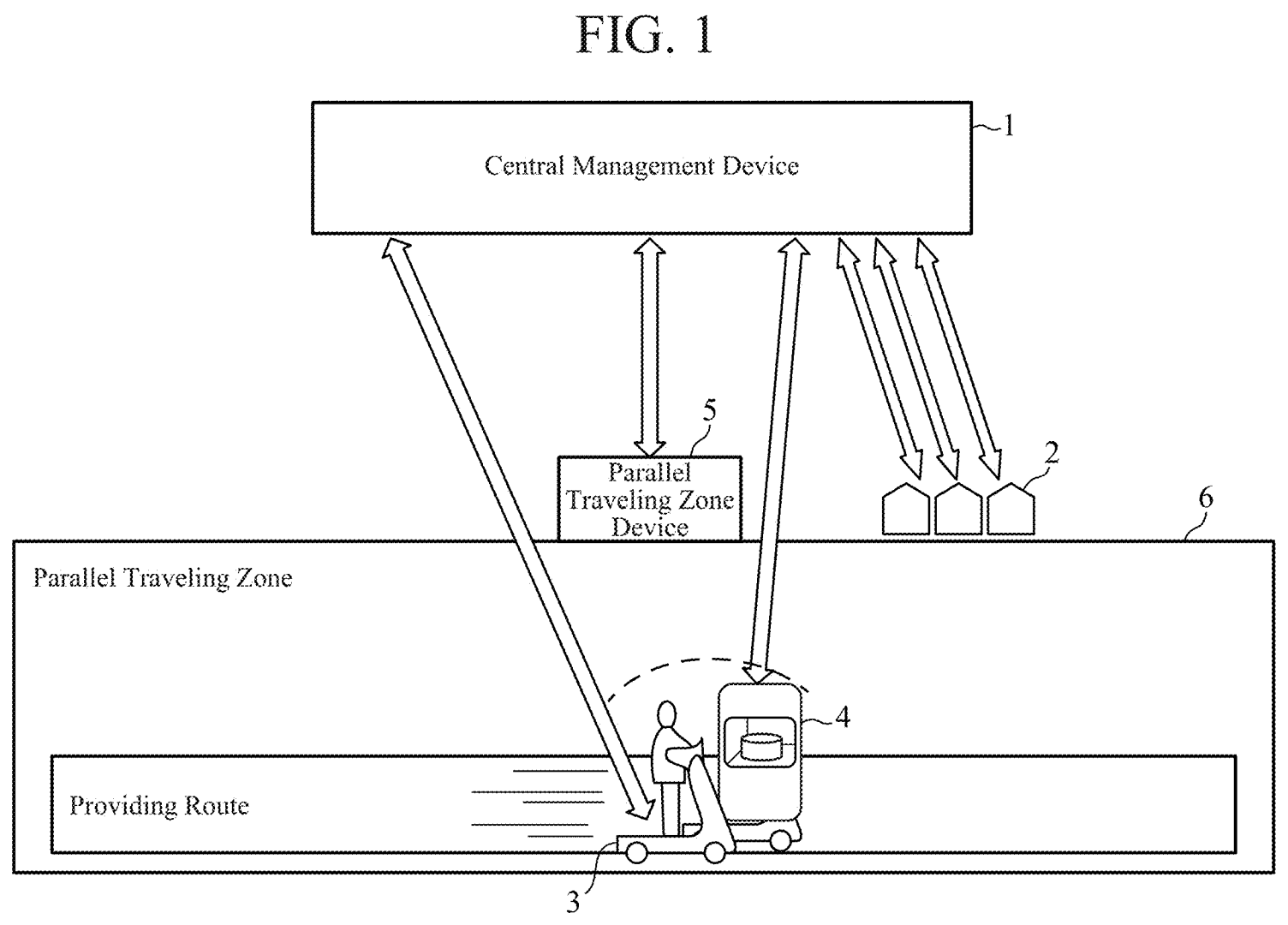

FIG. 1 is a diagram illustrating a configuration example of a parallel traveling management system according to Embodiment 1.

As illustrated in FIG. 1, the parallel traveling management system includes a central management device 1, providing facilities 2, a user vehicle 3, a delivery vehicle 4, and a parallel traveling zone device 5.

The central management device 1 manages delivery of goods at the providing facility 2 by managing parallel traveling of the user vehicle 3 and the delivery vehicle 4 in the parallel traveling zone 6. That is, this is a case where the parallel traveling management device is applied to the central management device 1. Note that a parallel traveling zone 6 is a zone in which the user vehicle 3 and the delivery vehicle 4 can travel in parallel, and is a zone in which goods can be delivered between the user vehicle 3 and the delivery vehicle 4.

Details of this central management device 1 will be described later.

The providing facility 2 is a facility for accepting an order of goods from a user and delivering the goods. Examples of this providing facility 2 include stores of commercial facilities such as drive-throughs or food courts, counters such as prescription counters of hospitals, or stores provided at wide-area facilities. Examples of the wide-area facilities include airports, golf courses, or promenades at tourist spots.

This providing facility 2 includes a communication unit 201 and an order acceptance unit 202 as illustrated in FIG. 2.

The communication unit 201 exchanges information with a communication unit 101 provided to the central management device 1, and a terminal such as a portable terminal held by the user.

The order acceptance unit 202 accepts an order of goods from the user. Information indicating the order of the goods accepted by this order acceptance unit 202 is sent to the central management device 1 via the communication unit 201. Note that the information indicating the order of the goods includes, for example, information indicating a type of the ordered goods, and a time at which the order of the goods has been accepted. Furthermore, the information indicating the order of this goods may include information indicating a parallel traveling style of the user vehicle 3 and the delivery vehicle 4 at a time of delivery of the goods. Note that specific examples of the parallel traveling styles will be described later.

Furthermore, at this time, the order acceptance unit 202 accepts information that enables identification of the user vehicle 3 in which the user is. Examples of the information that enables identification of the user vehicle 3 include a vehicle number allocated to the user vehicle 3. The information that is accepted by this order acceptance unit 202 and enables identification of the user vehicle 3 is sent to the central management device 1 via the communication unit 201.

Note that the user sends information indicating an order of goods to the order acceptance unit 202 using, for example, the terminal such as the portable terminal held by the user.

Similarly, the user sends the information that enables identification of the user vehicle 3 to the order acceptance unit 202 using, for example, the terminal such as the portable terminal held by the user.

Furthermore, when the central management device 1 sends information that indicates a provision available time of goods, the order acceptance unit 202 may present to the user the provision available time of the goods. That is, the order acceptance unit 202 sends information indicating the provision available time of the goods to the terminal such as the portable terminal held by the user via the communication unit 201.

Furthermore, when the central management device 1 sends information that enables identification of the delivery vehicle 4 used to deliver goods, the providing facility 2 gives notification of the information to a worker, a robot, or the like that loads the goods to the delivery vehicle 4.

Furthermore, the worker, the robot, or the like having accepted the above notification loads the goods to the delivery vehicle 4 indicated by the notification.

The user vehicle 3 is a vehicle in which the user is, and is a vehicle that can travel in the parallel traveling zone 6. This user vehicle 3 is personal mobility that can autonomously travel.

The user accepts the goods from the delivery vehicle 4 that travels in parallel by getting on the user vehicle 3 and travels in the parallel traveling zone 6 after ordering goods to the order acceptance unit 202, or by traveling in the parallel traveling zone 6 after ordering the goods to the order acceptance unit 202 while the user is in the user vehicle 3.

Figure 3:
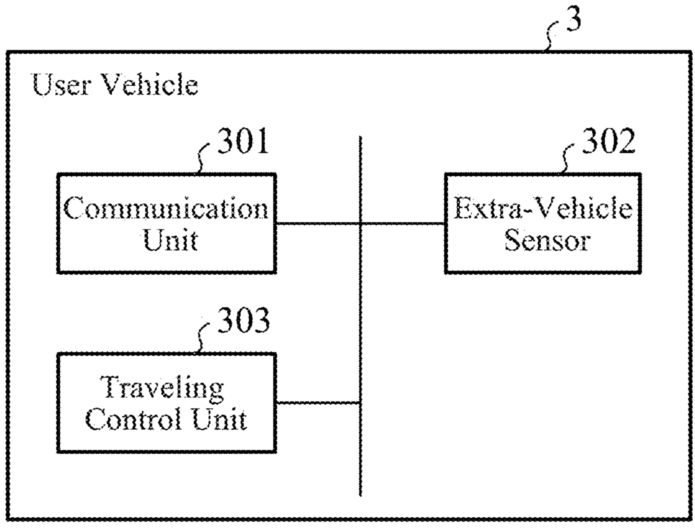
FIG. 3 is a diagram illustrating a configuration example of a user vehicle according to Embodiment 1.

As illustrated in FIG. 3, this user vehicle 3 includes a communication unit 301, an extra-vehicle sensor 302, and a traveling control unit 303.

The communication unit 301 exchanges information with the communication unit 101 provided to the central management device 1.

The extra-vehicle sensor 302 is a sensor that can detect a situation around the user vehicle 3. As this extra-vehicle sensor 302, for example, one or more of sensors such as a camera sensor, a position sensor, a LiDAR, and a sonar are used.

Data indicating a detection result of this extra-vehicle sensor 302 is sent to the central management device 1 via the communication unit 301 when at least the user vehicle 3 is in the parallel traveling zone 6.

The traveling control unit 303 controls traveling of the user vehicle 3 under control of the central management device 1 when at least the user vehicle 3 is in the parallel traveling zone 6. That is, the traveling control unit 303 controls a traveling route, a traveling speed, or the like of the user vehicle 3 under the above control.

The delivery vehicle 4 is a vehicle on which goods can be loaded and is a vehicle that can travel in the parallel traveling zone 6. This delivery vehicle 4 is a robot that can autonomously travel.

The delivery vehicle 4 travels in parallel to the user vehicle 3 in the parallel traveling zone 6 after the goods are loaded at the providing facility 2 to deliver the goods to the user who is in the user vehicle 3.

Figure 4:
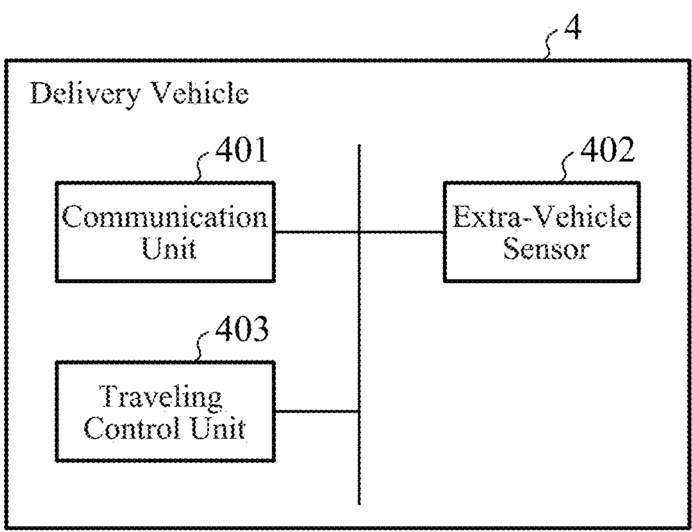
FIG. 4 is a diagram illustrating a configuration example of a delivery vehicle according to Embodiment 1.

As illustrated in FIG. 4, this delivery vehicle 4 includes a communication unit 401, an extra-vehicle sensor 402, and a traveling control unit 403.

The communication unit 401 exchanges information with the communication unit 101 provided to the central management device 1.

The extra-vehicle sensor 402 is a sensor that can detect a situation around the delivery vehicle 4. As this extra-vehicle sensor 402, for example, one or more of sensors such as a camera sensor, a position sensor, a LiDAR, and a sonar are used.

Data indicating a detection result of this extra-vehicle sensor 402 is sent to the central management device 1 via the communication unit 401.

The traveling control unit 403 controls traveling of the delivery vehicle 4 under control of the central management device 1. That is, the traveling control unit 403 controls the traveling route, the traveling speed, or the like of the delivery vehicle 4 under the above control.

The parallel traveling zone device 5 is a device that is provided in the parallel traveling zone 6.

Figure 5:
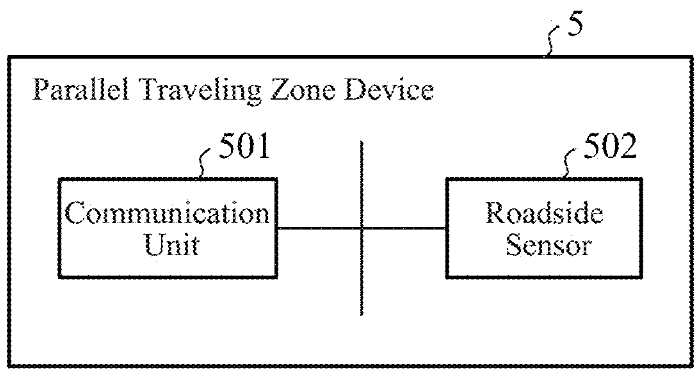
FIG. 5 is a diagram illustrating a configuration example of a parallel traveling zone device according to Embodiment 1.

This parallel traveling zone device 5 includes a communication unit 501 and a roadside sensor 502 as illustrated in FIG. 5.

The communication unit 501 exchanges information with the communication unit 101 provided to the central management device 1.

The roadside sensor 502 is a sensor that can detect a situation in the parallel traveling zone 6. As this roadside sensor 502, one or more sensors such as a camera sensor, a LiDAR, and a millimeter wave sensor are used. The one or more roadside sensors 502 are provided in the parallel traveling zone 6.

Data indicating a detection result of this roadside sensor 502 is sent to the central management device 1 via the communication unit 501.

Next, a configuration example of the central management device 1 will be described with reference to FIG. 6.

Figure 6:
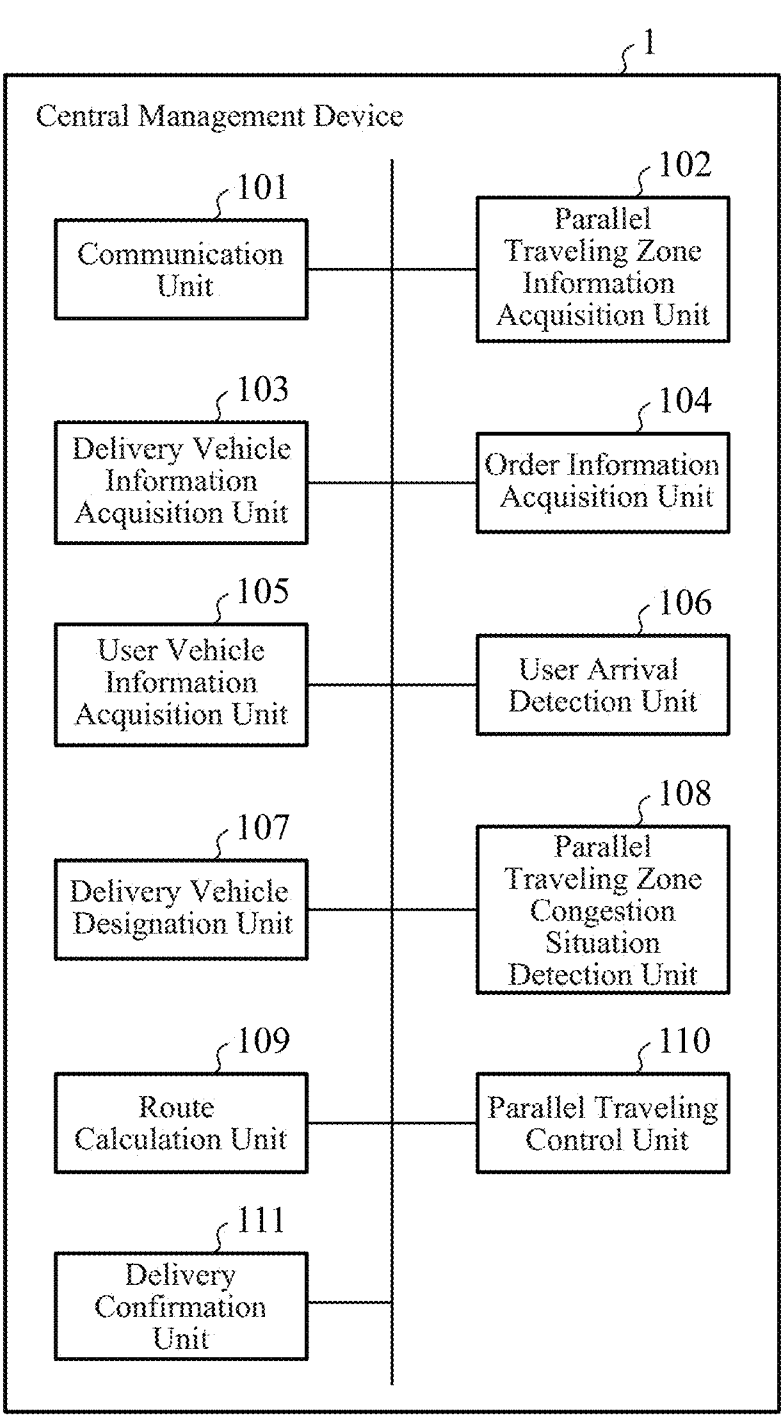
FIG. 6 is a diagram illustrating a configuration example of a central management device according to Embodiment 1.

As illustrated in FIG. 6, the central management device 1 includes the communication unit 101, a parallel traveling zone information acquisition unit 102, a delivery vehicle information acquisition unit 103, an order information acquisition unit 104, a user vehicle information acquisition unit 105, a user vehicle arrival detection unit 106, a delivery vehicle designation unit 107, a parallel traveling zone congestion situation detection unit 108, a route calculation unit 109, a parallel traveling control unit 110, and a delivery confirmation unit 111.

The communication unit 101 exchanges information with the communication unit 201 provided to the providing facility 2, the communication unit 301 provided to the user vehicle 3, the communication unit 401 provided to the delivery vehicle 4, and the communication unit 501 provided to the parallel traveling zone device 5.

The parallel traveling zone information acquisition unit 102 acquires information related to the parallel traveling zone 6. The information related to the parallel traveling zone 6 includes, for example, map information indicating the parallel traveling zone 6, and information indicating installation places and detection ranges of the roadside sensors 502 in the parallel traveling zone 6.

Note that the map information indicating the parallel traveling zone 6 is not limited to fixed map information, and map information whose positions of moving objects such as people or vehicles are updated in real time can be also used.

The delivery vehicle information acquisition unit 103 acquires information related to the delivery vehicle 4 used in the parallel traveling zone 6. The information related to the delivery vehicle 4 includes, for example, information that enables identification of the delivery vehicle 4, and information that indicates an operation status of the delivery vehicle 4. Examples of the information that enables identification of the delivery vehicle 4 include a vehicle number allocated to the delivery vehicle 4. Note that the information that indicates the operation status of the delivery vehicle 4 is desirably updated in real time.

The order information acquisition unit 104 acquires information indicating an order of goods sent by the order acceptance unit 202.

Furthermore, when acquiring the information indicating the order of the goods, the order information acquisition unit 104 may calculate the provision available time of the goods. In this case, for example, the order information acquisition unit 104 calculates the above provision available time of the goods by adding the provision available time set in advance to the above goods to the time at which the order of the goods has been accepted. Information indicating the provision available time of the goods calculated by this order information acquisition unit 104 is sent to the order acceptance unit 202 via the communication unit 101.

The user vehicle information acquisition unit 105 acquires information that is sent by the order acceptance unit 202 and enables identification of the user vehicle 3.

The user vehicle arrival detection unit 106 detects that the user vehicle 3 in which the user is has arrived at the parallel traveling zone 6. At this time, the user vehicle arrival detection unit 106 performs the above detection on the basis of one or more of detection results of the roadside sensors 502 provided to the parallel traveling zone device 5, and a detection result of the extra-vehicle sensor 302 provided to the user vehicle 3.

For example, the user vehicle arrival detection unit 106 may detect the arrival of the user vehicle 3 by confirming on the basis of the detection results of the roadside sensors 502 provided to the parallel traveling zone device 5 that the user vehicle 3 to which information matching with the information that is acquired by the user vehicle information acquisition unit 105 and enables identification of the user vehicle 3 has been assigned has entered the parallel traveling zone 6.

Furthermore, for example, the user vehicle arrival detection unit 106 may detect the arrival of the user vehicle 3 by confirming on the basis of the detection result of the extra-vehicle sensor 302 provided to the user vehicle 3 that the user vehicle 3 has entered an environment matching with an environment in the parallel traveling zone 6.

Furthermore, for example, the user vehicle arrival detection unit 106 may detect the arrival of the user vehicle 3 on the basis of a time at which a vehicle estimated as the user vehicle 3 has entered the parallel traveling zone 6, and the provision available time of the goods calculated by the order information acquisition unit 104, too, in addition to the above. That is, for example, the user vehicle arrival detection unit 106 may determine that, when the time at which the vehicle estimated as the user vehicle 3 has entered the parallel traveling zone 6 is within a predetermined time range of the provision available time of the goods, the vehicle is the user vehicle 3, and detect the arrival of the user vehicle 3.

The delivery vehicle designation unit 107 designates the delivery vehicle 4 used to deliver goods. At this time, the delivery vehicle designation unit 107 performs the above designation on the basis of an acquisition result of the order information acquisition unit 104 and an acquisition result of the delivery vehicle information acquisition unit 103.

For example, the delivery vehicle designation unit 107 designates among the delivery vehicles 4 the delivery vehicle 4 to which the goods indicated by the information acquired by the order information acquisition unit 104 can be loaded and that is currently standing by.

The information that enables identification of the delivery vehicle 4 designated by this delivery vehicle designation unit 107 is sent to the providing facility 2 via the communication unit 101.

The parallel traveling zone congestion situation detection unit 108 detects a congestion situation of the parallel traveling zone 6 when the user vehicle arrival detection unit 106 detects that the user vehicle 3 has arrived at the parallel traveling zone 6. At this time, the parallel traveling zone congestion situation detection unit 108 performs the above detection on the basis of one or more of the detection results of the roadside sensors 502 provided to the parallel traveling zone device 5, the detection result of the extra-vehicle sensor 302 provided to the user vehicle 3, and a detection result of the extra-vehicle sensor 402 provided to the delivery vehicle 4.

The route calculation unit 109 calculates on the basis of a detection result of the parallel traveling zone congestion situation detection unit 108 a traveling route of the user vehicle 3 at a time at which the goods are delivered, and a traveling route of the delivery vehicle 4 designated by the delivery vehicle designation unit 107. At this time, the route calculation unit 109 performs the above calculation while referring to an acquisition result of the parallel traveling zone information acquisition unit 102.

Here, for example, the route calculation unit 109 calculates a route at which the goods can be delivered in the shortest time safely as the traveling route of the user vehicle 3 at the time at which the goods are delivered, and the traveling route of the delivery vehicle 4. That is, for example, the route calculation unit 109 calculates a route including less people, the less other user vehicles 3, or the less delivery vehicles 4 in the parallel traveling zone 6.

Note that, at this time, the route calculation unit 109 desirably performs the above calculation on the basis of parallel traveling styles of the user vehicle 3 and the delivery vehicle 4, too. Note that the parallel traveling styles of the user vehicle 3 and the delivery vehicle 4 can be confirmed on the basis of a type of the goods indicated by the information acquired by the order information acquisition unit 104 or a parallel traveling style selected by the user.

Furthermore, the route calculation unit 109 may further calculate the traveling speed of the user vehicle 3 at the time at which the goods are delivered, and the traveling speed of the delivery vehicle 4 designated by the delivery vehicle designation unit 107 on the basis of the detection result of the parallel traveling zone congestion situation detection unit 108 in addition to the above.

The parallel traveling control unit 110 controls parallel traveling of the user vehicle 3 and the delivery vehicle 4 designated by the delivery vehicle designation unit 107 on the basis of a calculation result of the route calculation unit 109, and instruct the delivery of the goods. At this time, the parallel traveling control unit 110 dynamically controls parallel traveling on the basis of one or more of the detection result of the extra-vehicle sensor 302 provided to the user vehicle 3 and the detection result of the extra-vehicle sensor 402 provided to the delivery vehicle 4, and the detection results of the roadside sensors 502 provided to the parallel traveling zone device 5.

The delivery confirmation unit 111 confirms that delivery of the goods has been completed after the control by the parallel traveling control unit 110.

At this time, for example, after accepting goods, the user may send to the central management device 1 an acceptance confirmation notification using the terminal such as the portable terminal held by the user. In this case, the delivery confirmation unit 111 can confirm completion of delivery of the goods by accepting this acceptance confirmation notification.

Furthermore, for example, a sensor such as a load sensor or an image sensor that can detect whether or not the goods are loaded may be attached to the delivery vehicle 4, and the sensor may be configured to send a detection result to the central management device 1. In this case, the delivery confirmation unit 111 can confirm completion of delivery of the goods by confirming a change corresponding to whether or not there are goods on the basis of the detection result of the above sensor.

Furthermore, when confirming that delivery of the goods is not completed, that is, delivery of the goods has failed, the delivery confirmation unit 111 instructs the parallel traveling zone congestion situation detection unit 108 to perform detection again. Subsequently, the central management device 1 causes the user vehicle 3 and the delivery vehicle 4 to deliver the goods again.

At this time, when, for example, failing in accepting the goods, the user may send to the central management device 1 an acceptance failure notification using the terminal such as the portable terminal held by the user. In this case, the delivery confirmation unit 111 can confirm a failure of delivery of the goods by accepting this acceptance failure notification.

Furthermore, for example, a sensor such as a load sensor or an image sensor that can detect whether or not the goods are loaded may be attached to the delivery vehicle 4, and the sensor may be configured to send a detection result to the central management device 1. In this case, the delivery confirmation unit 111 can confirm the failure of delivery of the goods when it is not confirmed on the basis of the detection result of the above sensor when a change corresponding to whether or not there are goods is not confirmed even after a certain period of time passes.

Note that FIG. 6 illustrates a case where the central management device 1 is provided with the delivery vehicle designation unit 107 and the delivery confirmation unit 111. However, these delivery vehicle designation unit 107 and delivery confirmation unit 111 are not indispensable components of the central management device 1, and may not be provided to the central management device 1.

Next, an operation example of the central management device 1 according to Embodiment 1 illustrated in FIG. 6 will be described with reference to FIG. 7.

Note that the parallel traveling zone information acquisition unit 102 acquires the information related to the parallel traveling zone 6. The information related to the parallel traveling zone 6 includes, for example, the map information indicating the parallel traveling zone 6, and information indicating the installation places and the detection ranges of the roadside sensors 502 in the parallel traveling zone 6.

Furthermore, the delivery vehicle information acquisition unit 103 acquires the information related to the delivery vehicle 4 used in the parallel traveling zone 6. The information related to the delivery vehicle 4 includes, for example, the information that enables identification of the delivery vehicle 4, and the information that indicates the operation status of the delivery vehicle 4. Note that the information that indicates the operation status of the delivery vehicle 4 is desirably updated in real time.

Figure 7:
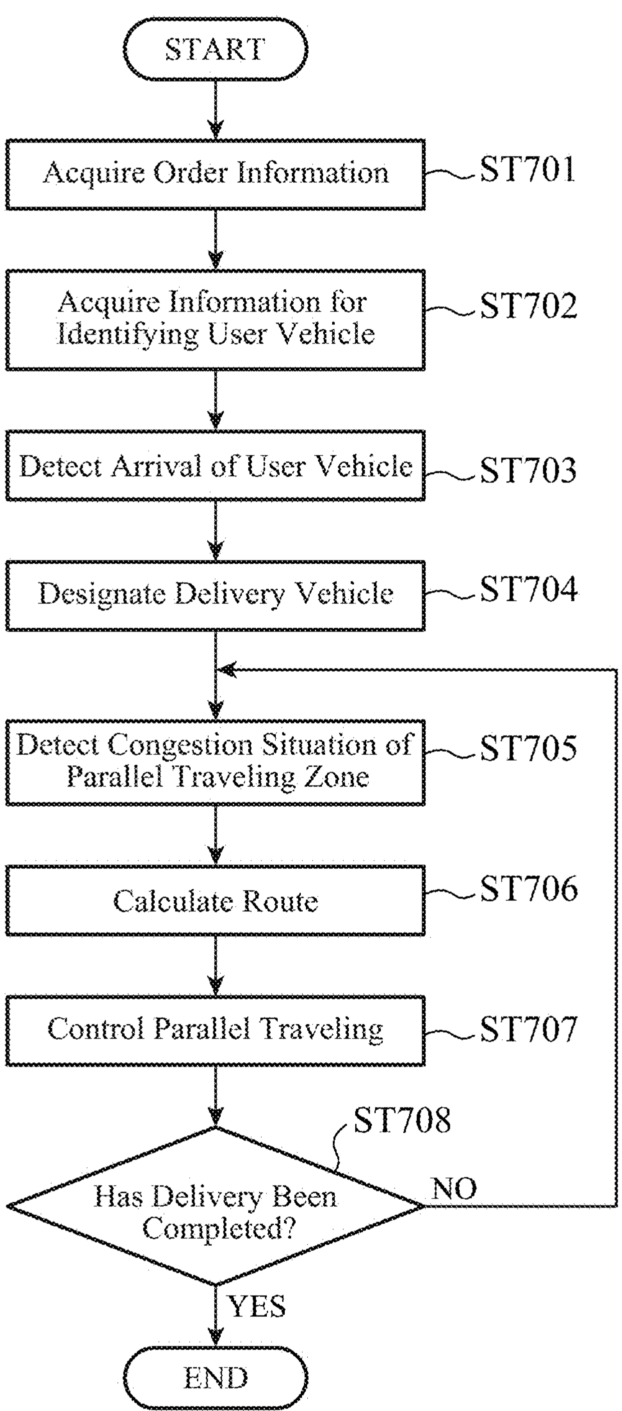
FIG. 7 is a flowchart illustrating an operation example of the central management device according to Embodiment 1.

In an operation example of the central management device 1 according to Embodiment 1 illustrated in FIG. 6, as illustrated in FIG. 7, first, the order information acquisition unit 104 acquires the information indicating the order of the goods sent by the order acceptance unit 202 (step ST701).

Furthermore, when acquiring the information indicating the order of the goods, the order information acquisition unit 104 may calculate the provision available time of the goods. In this case, the order information acquisition unit 104 calculates the above provision available time of the goods by adding the provision available time set in advance to the above goods to the time at which the order of the goods has been accepted. Information indicating the provision available time of the goods calculated by this order information acquisition unit 104 is sent to the order acceptance unit 202 via the communication unit 101.

Furthermore, the user vehicle information acquisition unit 105 acquires the information that enables identification of the user vehicle 3 sent by the order acceptance unit 202 (step ST702).

Next, the user vehicle arrival detection unit 106 detects that the user vehicle 3 in which the user is has arrived at the parallel traveling zone 6 (step ST703). At this time, the user vehicle arrival detection unit 106 performs the above detection on the basis of one or more of detection results of the roadside sensors 502 provided to the parallel traveling zone device 5, and a detection result of the extra-vehicle sensor 302 provided to the user vehicle 3.

For example, the user vehicle arrival detection unit 106 may detect the arrival of the user vehicle 3 by confirming on the basis of the detection results of the roadside sensors 502 provided to the parallel traveling zone device 5 that the user vehicle 3 to which information matching with the information that is acquired by the user vehicle information acquisition unit 105 and enables identification of the user vehicle 3 has been assigned has entered the parallel traveling zone 6.

Furthermore, for example, the user vehicle arrival detection unit 106 may detect the arrival of the user vehicle 3 by confirming on the basis of the detection result of the extra-vehicle sensor 302 provided to the user vehicle 3 that the user vehicle 3 has entered an environment matching with an environment in the parallel traveling zone 6.

Furthermore, for example, the user vehicle arrival detection unit 106 may detect the arrival of the user vehicle 3 on the basis of a time at which a vehicle estimated as the user vehicle 3 has entered the parallel traveling zone 6, and the provision available time of the goods calculated by the order information acquisition unit 104, too, in addition to the above. That is, the user vehicle arrival detection unit 106 may determine that, when the time at which the vehicle estimated as the user vehicle 3 has entered the parallel traveling zone 6 is within a predetermined time range of the provision available time of the goods, the vehicle is the user vehicle 3, and detect the arrival of the user vehicle 3.

Furthermore, the delivery vehicle designation unit 107 designates the delivery vehicle 4 used to deliver goods (step ST704). At this time, the delivery vehicle designation unit 107 performs the above designation on the basis of the acquisition result of the order information acquisition unit 104 and the acquisition result of the delivery vehicle information acquisition unit 103.

For example, the delivery vehicle designation unit 107 designates among the delivery vehicles 4 the delivery vehicle 4 to which the goods indicated by the information acquired by the order information acquisition unit 104 can be loaded and that is currently standing by.

The information that enables identification of the delivery vehicle 4 designated by this delivery vehicle designation unit 107 is sent to the providing facility 2 via the communication unit 101.

Subsequently, the providing facility 2 accepts the information that is sent from the central management device 1 and enables identification of the delivery vehicle 4 used to deliver the goods, and gives notification of the information to a worker, a robot, or the like that loads the goods to the delivery vehicle 4.

Furthermore, the worker, the robot, or the like having accepted the above notification loads the goods to the delivery vehicle 4 indicated by the notification.

Next, the parallel traveling zone congestion situation detection unit 108 detects the congestion situation of the parallel traveling zone 6 when the user vehicle arrival detection unit 106 detects that the user vehicle 3 has arrived at the parallel traveling zone 6 (step ST705). At this time, the parallel traveling zone congestion situation detection unit 108 performs the above detection on the basis of one or more of the detection results of the roadside sensors 502 provided to the parallel traveling zone device 5, the detection result of the extra-vehicle sensor 302 provided to the user vehicle 3, and a detection result of the extra-vehicle sensor 402 provided to the delivery vehicle 4.

Next, the route calculation unit 109 calculates on the basis of the detection result of the parallel traveling zone congestion situation detection unit 108 the traveling route of the user vehicle 3 at the time at which the goods are delivered, and the traveling route of the delivery vehicle 4 designated by the delivery vehicle designation unit 107 (step ST706). At this time, the route calculation unit 109 performs the above calculation while referring to an acquisition result of the parallel traveling zone information acquisition unit 102.

Here, when, for example, the number of orders of goods increases, delivery of the goods in the parallel traveling zone 6 increases, and therefore congestion occurs in the parallel traveling zone 6. Hence, for example, the route calculation unit 109 calculates a route that makes it possible to avoid a waiting traffic jam depending on the congestion situation detected by the parallel traveling zone congestion situation detection unit 108.

Note that, at this time, the route calculation unit 109 desirably performs the above calculation on the basis of the parallel traveling styles of the user vehicle 3 and the delivery vehicle 4, too. Note that the parallel traveling styles of the user vehicle 3 and the delivery vehicle 4 can be confirmed on the basis of a type of the goods indicated by the information acquired by the order information acquisition unit 104 or a parallel traveling style selected by the user.

Furthermore, the route calculation unit 109 may further calculate the traveling speed of the user vehicle 3 at the time at which the goods are delivered, and the traveling speed of the delivery vehicle 4 designated by the delivery vehicle designation unit 107 on the basis of the detection result of the parallel traveling zone congestion situation detection unit 108 in addition to the above.

Next, the parallel traveling control unit 110 controls parallel traveling of the user vehicle 3 and the delivery vehicle 4 designated by the delivery vehicle designation unit 107 on the basis of the calculation result of the route calculation unit 109, and instruct the delivery of the goods (step ST707). At this time, the parallel traveling control unit 110 dynamically controls parallel traveling on the basis of one or more of the detection result of the extra-vehicle sensor 302 provided to the user vehicle 3 and the detection result of the extra-vehicle sensor 402 provided to the delivery vehicle 4, and the detection result of the roadside sensor 502 provided to the parallel traveling zone device 5.

This parallel traveling control unit 110 delivers the goods in a state where the user vehicle 3 and the delivery vehicle 4 travel in parallel without stopping once.

Furthermore, by using the detection results of the roadside sensors 502, the parallel traveling control unit 110 can perform detection in a region that is a blind spot for the extra-vehicle sensor 302 and the extra-vehicle sensor 402 as compared to a case where only the detection result of the extra-vehicle sensor 302 and the detection result of the extra-vehicle sensor 402 are used. In this case, the parallel traveling control unit 110 can more accurately control parallel traveling.

Hereinafter, specific examples of operations of the route calculation unit 109 and the parallel traveling control unit 110 will be described with reference to FIGS. 8 to 12.

Here, examples of the parallel traveling styles of the user vehicle 3 and the delivery vehicle 4 controlled by the parallel traveling control unit 110 include face-to-face parallel traveling illustrated in FIG. 8, follow-up-from-behind illustrated in FIG. 9, and side-by-side parallel traveling illustrated in FIG. 10. Note that reference numeral 7 illustrated in FIGS. 8 to 10 denotes goods. Furthermore, arrows indicated by broken lines in FIGS. 8 to 10 indicate the traveling route of the user vehicle 3 and the traveling route of the delivery vehicle 4.

The face-to-face parallel traveling illustrated in FIG. 8 refers to a parallel traveling style that the user vehicle 3 and the delivery vehicle 4 travel in parallel in a column in a state where the user vehicle 3 and the delivery vehicle 4 face each other. This face-to-face parallel traveling is the effective parallel traveling style in a case where, for example, goods are goods that require explanation at a time of delivery. Examples of the goods that require explanation at the time of delivery include drugs.

Figures 8A, 8B, 8C:
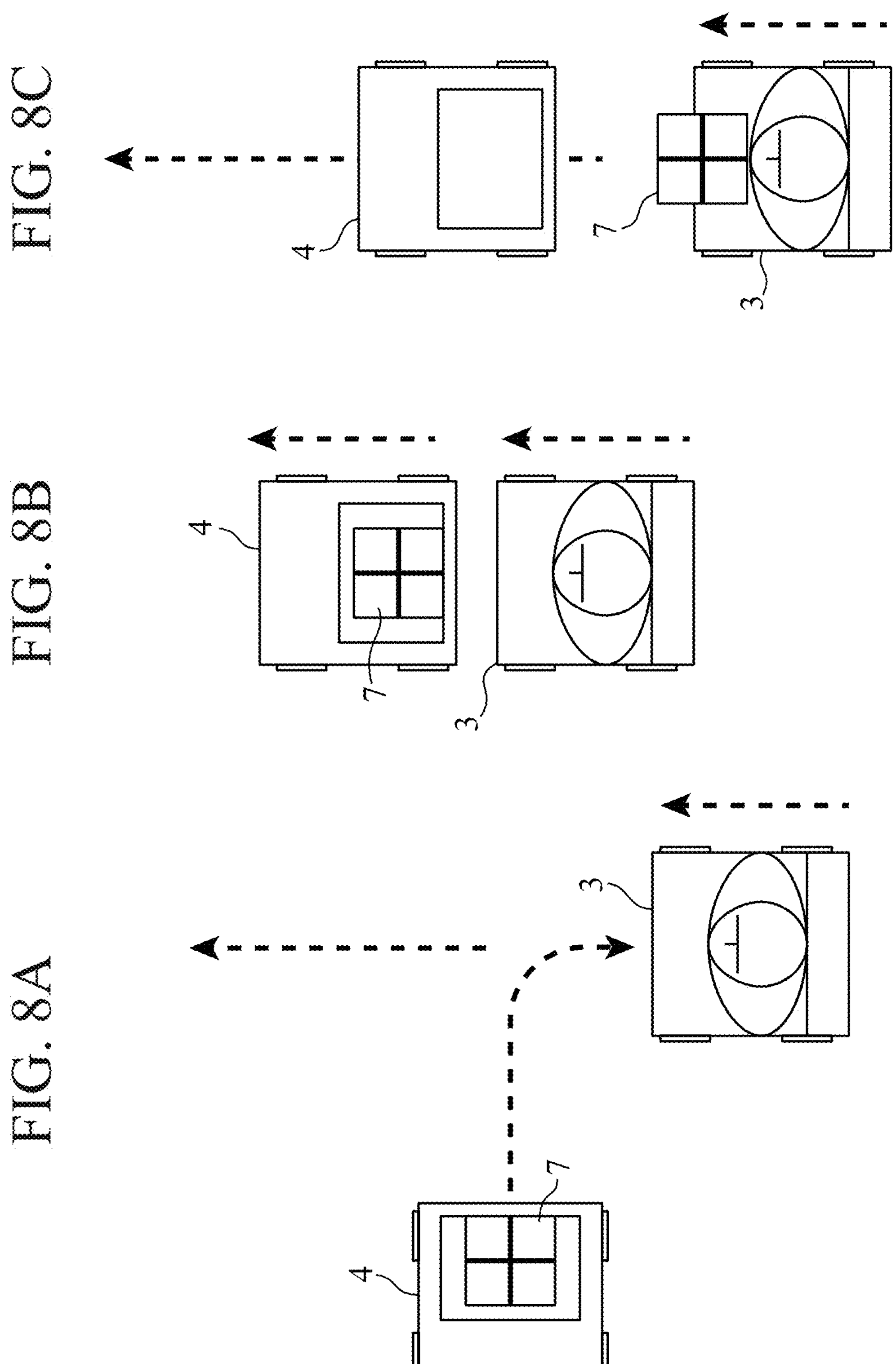
FIGS. 8A to 8C are diagrams illustrating examples of parallel traveling styles of the user vehicle and the delivery vehicle according to Embodiment 1.

According to this face-to-face parallel traveling control, for example, first, as illustrated in FIG. 8A, the parallel traveling control unit 110 causes the delivery vehicle 4 to which the goods have been loaded to move facing the front of the user vehicle 3 in a forward direction, and then causes the delivery vehicle 4 to switch to back traveling and move to make the user vehicle 3 and the delivery vehicle 4 face each other.

Subsequently, as illustrated in FIG. 8B, the parallel traveling control unit 110 causes the user vehicle 3 and the delivery vehicle 4 to travel in an identical (that includes the meaning of substantially identical) direction and at an identical (that includes the meaning of substantially identical) speed to travel in parallel in tandem in a state where the user vehicle 3 and the delivery vehicle 4 face each other. Note that, to safely deliver the goods between the user vehicle 3 and the delivery vehicle 4, the parallel traveling control unit 110 may lower the traveling speeds of the user vehicle 3 and the delivery vehicle 4 compared to a traveling speed at a time of normal traveling. Furthermore, the delivery vehicle 4 stores the goods in a storage (not illustrated) provided at the front of the user vehicle 3 or the user itself accepts the goods. Furthermore, at this time, for example, the delivery vehicle 4 may display explanation of or audibly explain delivery target goods to the user vehicle 3.

Furthermore, after delivery of the goods, the parallel traveling control unit 110 moves the delivery vehicle 4 away from the user vehicle 3 as illustrated in FIG. 8C.

Furthermore, the follow-up-from-behind illustrated in FIG. 9 refers to a parallel traveling style that the delivery vehicle 4 travels in parallel to the user vehicle 3 in tandem following up the user vehicle 3 from behind. This follow-up-from-behind is the effective parallel traveling style in a case where, for example, goods are goods that do not require explanation at a time of delivery, and the goods are stored in a storage (not illustrated) provided at the back of the user vehicle 3.

Figures 9A, 9B, 9C:
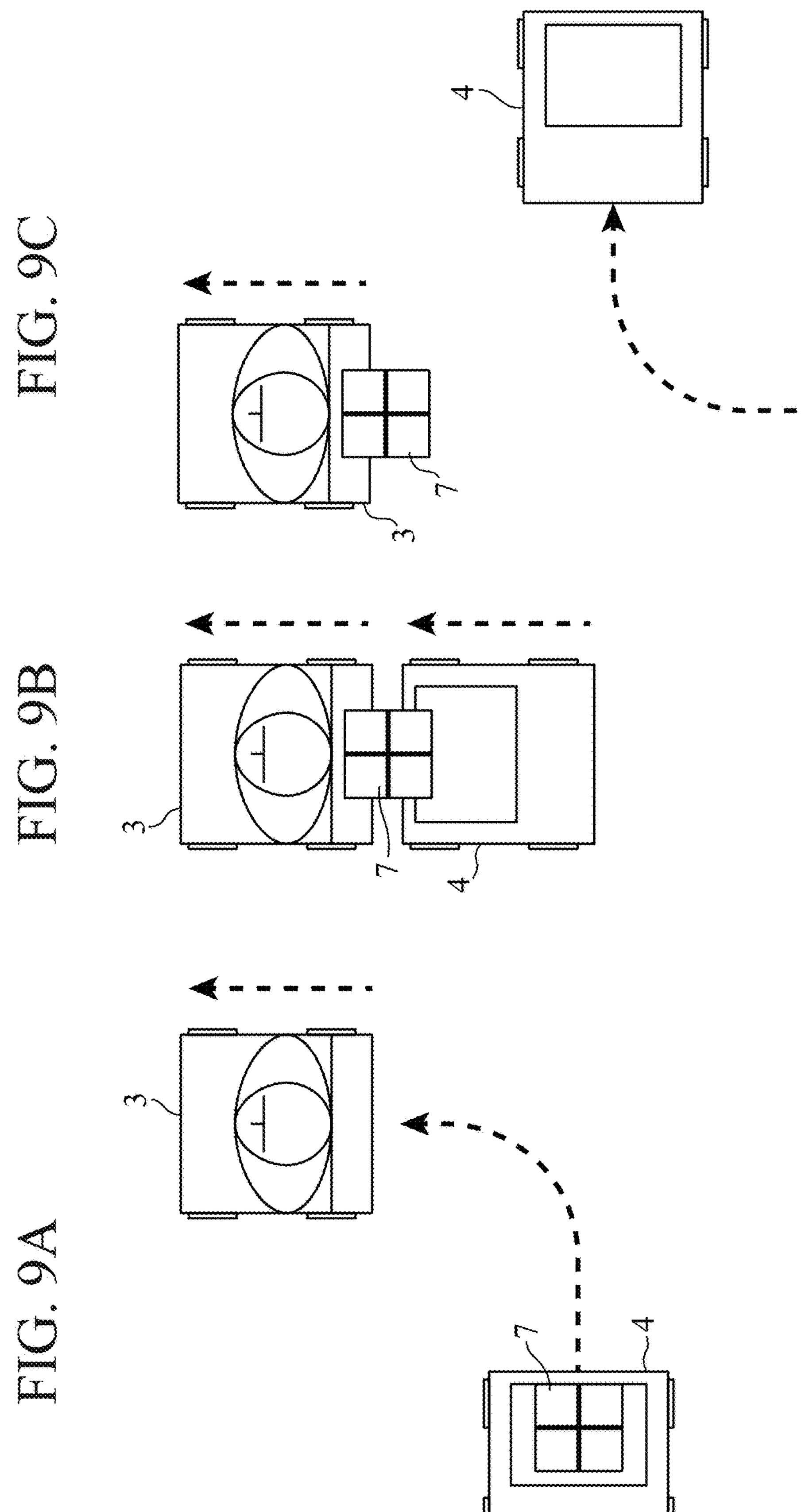
FIGS. 9A to 9C are diagrams illustrating examples of parallel traveling styles of the user vehicle and the delivery vehicle according to Embodiment 1.

According to this follow-up-from-behind, for example, first, as illustrated in FIG. 9A, the parallel traveling control unit 110 causes the delivery vehicle 4 to which the goods have been loaded to go around to right behind the user vehicle 3, and then follow up the user vehicle 3.

Subsequently, as illustrated in FIG. 9B, the parallel traveling control unit 110 causes the user vehicle 3 and the delivery vehicle 4 to travel in an identical (that includes the meaning of substantially identical) direction and at an identical (that includes the meaning of substantially identical) speed to travel in parallel in tandem in a follow-up state. Note that, to safely deliver the goods between the user vehicle 3 and the delivery vehicle 4, the parallel traveling control unit 110 may lower the traveling speeds of the user vehicle 3 and the delivery vehicle 4 compared to the traveling speed at a time of normal running. Furthermore, the delivery vehicle 4 stores the goods in the storage provided at the back of the user vehicle 3.

Furthermore, after delivery of the goods, the parallel traveling control unit 110 moves the delivery vehicle 4 away from the user vehicle 3 as illustrated in FIG. 9C.

Furthermore, the side-by-side parallel traveling illustrated in FIG. 10 refers to a parallel traveling style that the user vehicle 3 and the delivery vehicle 4 travel in parallel in a row in a state where the user vehicle 3 and the delivery vehicle 4 are side by side. This side-by-side parallel traveling is the effective parallel traveling style in a case where, for example, goods are goods that do not require explanation at a time of delivery, and the goods are stored in a storage (not illustrated) provided at the front of the user vehicle 3 or the user itself accepts the goods.

Figures 10A, 10B, 10C:
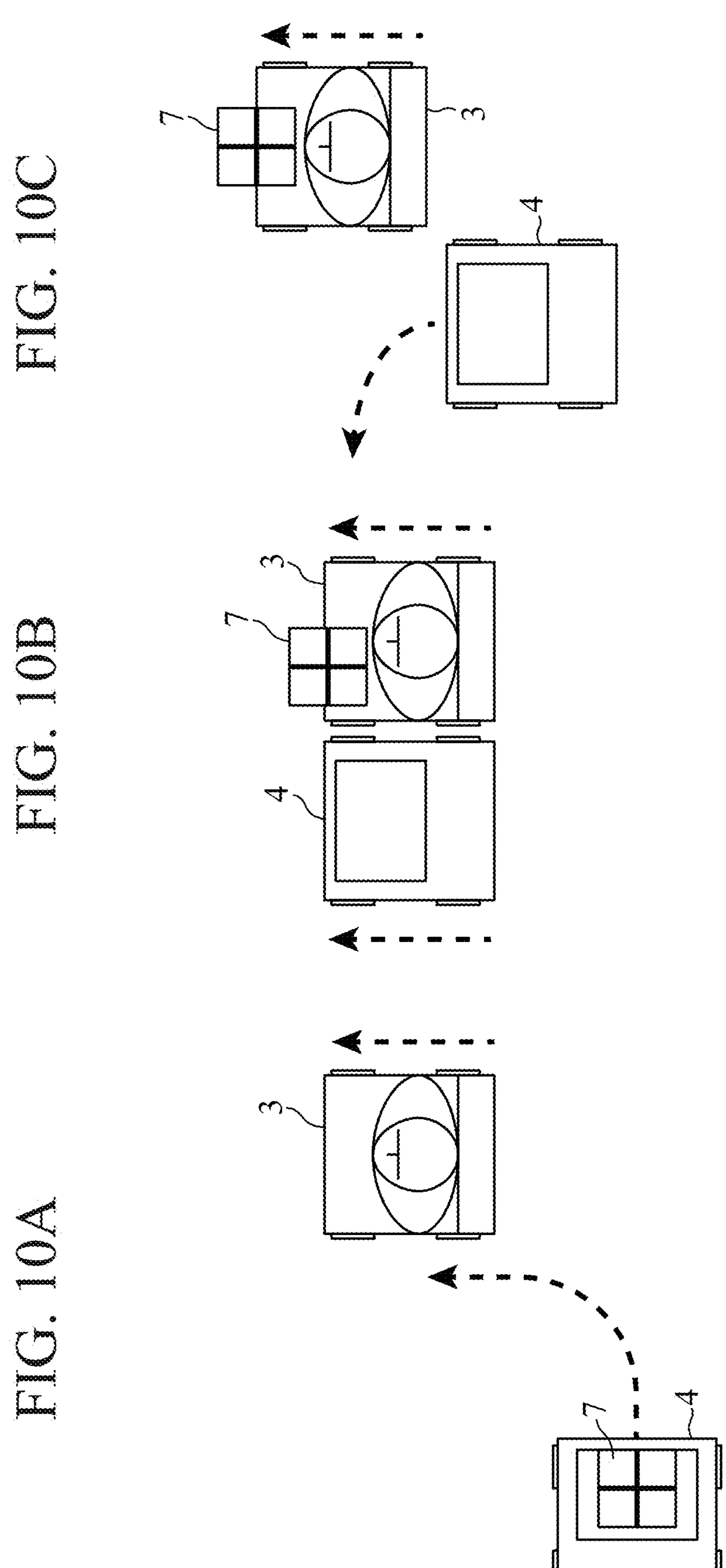
FIGS. 10A to 10C are diagrams illustrating examples of parallel traveling styles of the user vehicle and the delivery vehicle according to Embodiment 1.

According to this side-by-side parallel traveling, for example, first, as illustrated in FIG. 10A, the parallel traveling control unit 110 causes the delivery vehicle 4 to go around to diagonally behind the user vehicle 3, and then follow up the user vehicle 3 to bring the user vehicle 3 and the delivery vehicle 4 in a state where the user vehicle 3 and the delivery vehicle 4 are side by side.

Subsequently, as illustrated in FIG. 10B, the parallel traveling control unit 110 causes the user vehicle 3 and the delivery vehicle 4 to travel in an identical (that includes the meaning of substantially identical) direction and at an identical (that includes the meaning of substantially identical) speed to travel in parallel in a row in a state where the user vehicle 3 and the delivery vehicle 4 are side by side. Note that, to safely deliver the goods between the user vehicle 3 and the delivery vehicle 4, the parallel traveling control unit 110 may lower the traveling speeds of the user vehicle 3 and the delivery vehicle 4 compared to that at a time of normal running. Furthermore, the delivery vehicle 4 stores the goods in the storage provided at the back of the user vehicle 3 or the user itself accepts the goods.

Furthermore, after delivery of the goods, the parallel traveling control unit 110 moves the delivery vehicle 4 away from the user vehicle 3 as illustrated in FIG. 10C.

Figure 11:
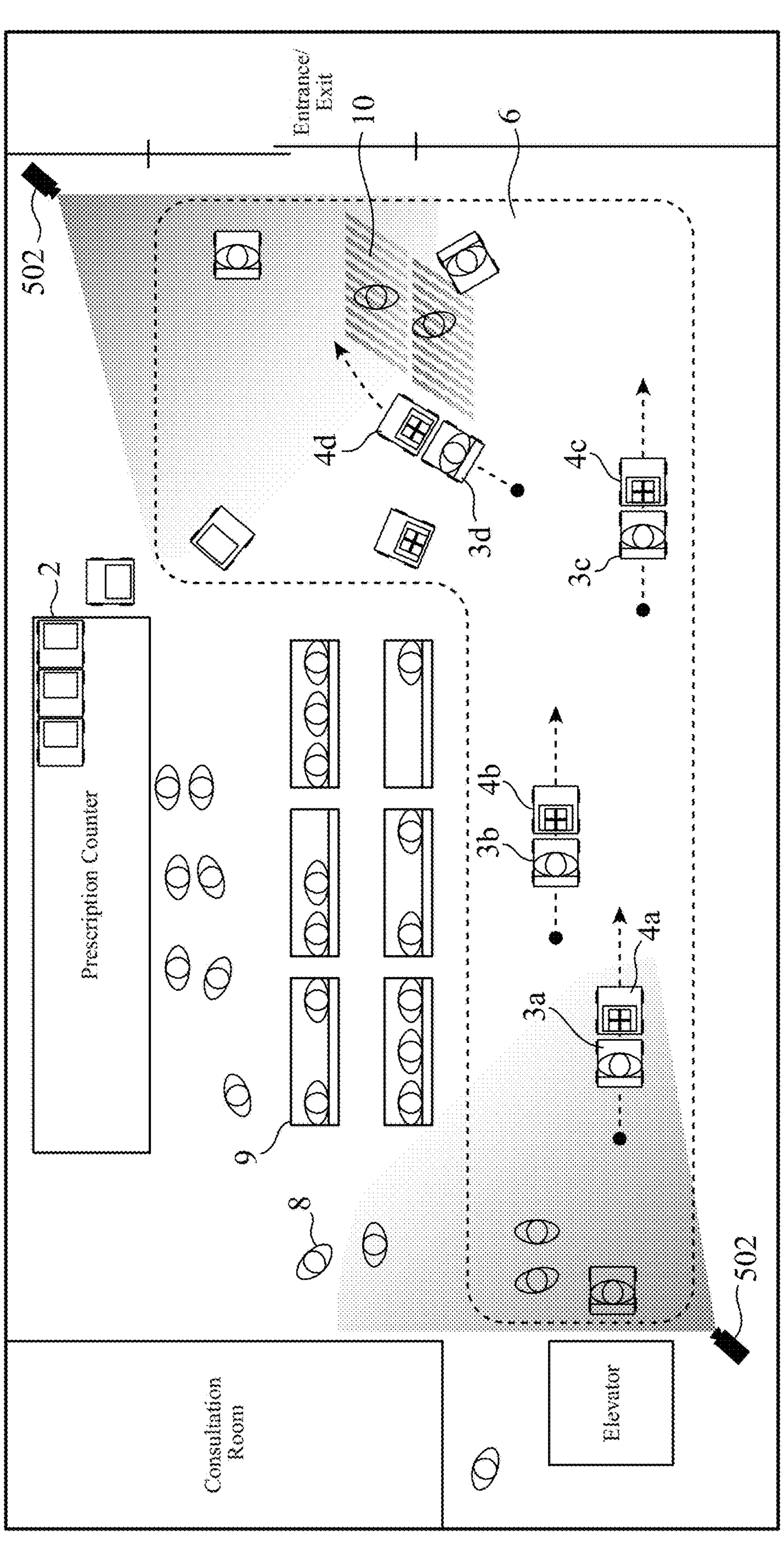
FIG. 11 is a diagram illustrating a specific example of operations of a route calculation unit and a parallel traveling control unit according to Embodiment 1.

Furthermore, FIG. 11 illustrates an example of a case where the providing facility 2 is a prescription counter of a hospital including the parallel traveling zone 6. Furthermore, in this FIG. 11, the two roadside sensors 502 are provided in the parallel traveling zone 6 included in the providing facility 2. Furthermore, FIG. 11 illustrates user vehicles 3*a* to 3*d* and delivery vehicles 4*a* to 4*d* as the processing target user vehicles 3 and delivery vehicles 4 of the route calculation unit 109 and the parallel traveling control unit 110. Furthermore, in FIG. 11, reference numeral 8 denotes a person, reference numeral 9 denotes a bench, and reference numeral 10 denotes a congestion area. The congestion area is an area that is determined as a more congested area by the parallel traveling zone congestion situation detection unit 108.

In this case, for example, the route calculation unit 109 calculates a linear route since there is no congestion area that is an obstacle for the user vehicle 3*a* and the delivery vehicle 4*a*. Similarly, for example, the route calculation unit 109 calculates a linear route since there is no congestion area that is an obstacle for the user vehicle 3*b* and the delivery vehicle 4*b*. Similarly, for example, the route calculation unit 109 calculates a linear route since there is no congestion area that is an obstacle for the user vehicle 3*c* and the delivery vehicle 4*c*.

On the other hand, for example, the route calculation unit 109 calculates a route that avoids this congestion area since there is a congestion area that is an obstacle for the user vehicle 3*d* and the delivery vehicle 4*d*.

Note that FIG. 11 assumes a case where goods are drugs, and the face-to-face parallel traveling is selected as the parallel traveling style. Furthermore, the parallel traveling control unit 110 controls parallel traveling of the user vehicles 3*a* to 3*d* and the delivery vehicles 4*a* to 4*c* depending on routes calculated by the route calculation unit 109 as described above.

Figure 12:
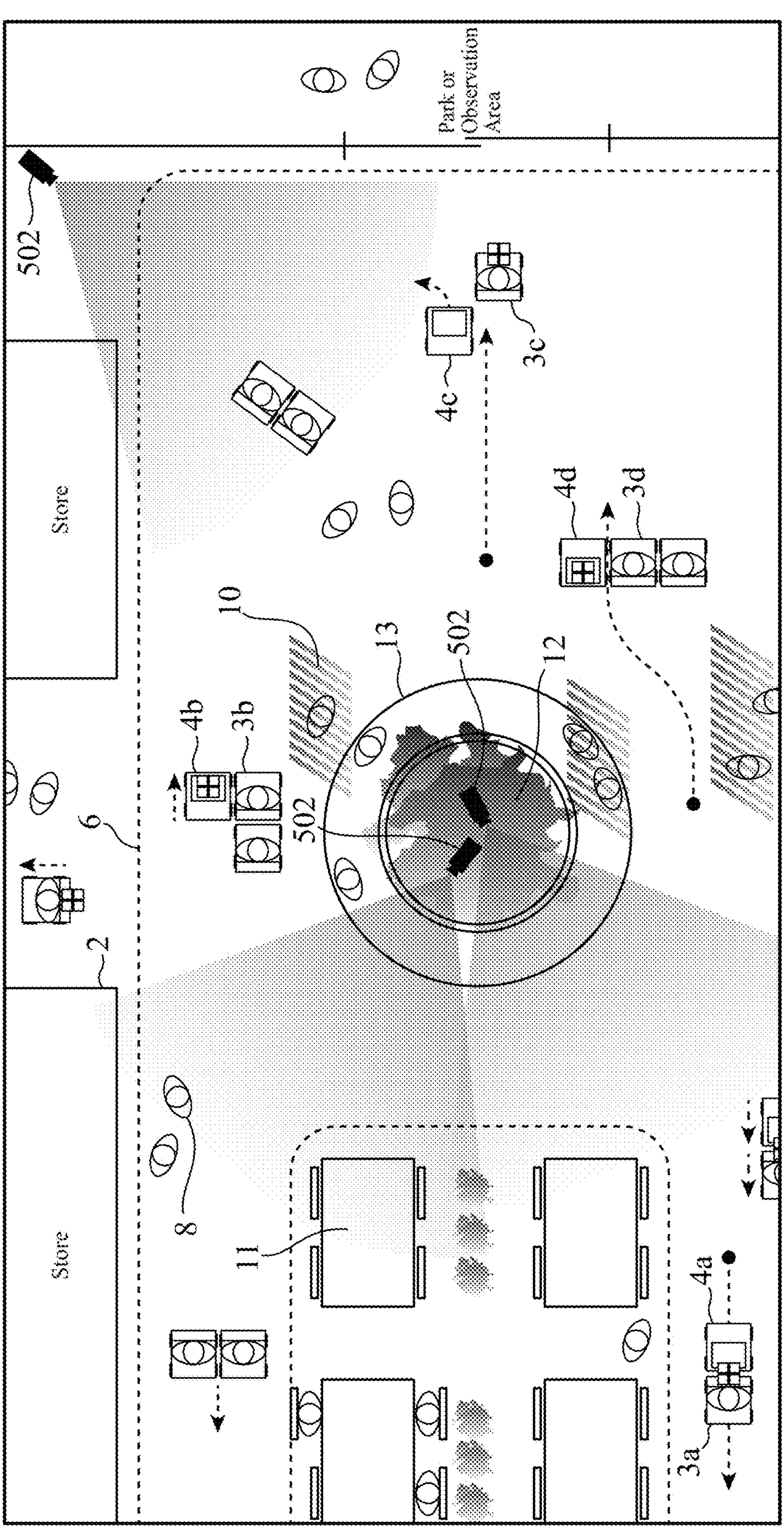
FIG. 12 is a diagram illustrating a specific example of the operations of the route calculation unit and the parallel traveling control unit according to Embodiment 1.

Furthermore, FIG. 12 illustrates an example of a case where the providing facility 2 is a store of a commercial facility including the parallel traveling zone 6. Furthermore, in this FIG. 12, the three roadside sensors 502 are provided in the parallel traveling zone 6 included in the providing facility 2. Furthermore, FIG. 12 illustrates user vehicles 3*a* to 3*d* and delivery vehicles 4*a* to 4*d* as the processing targets user vehicles 3 and delivery vehicles 4 of the route calculation unit 109 and the parallel traveling control unit 110. Furthermore, in FIG. 12, reference numeral 11 denotes a table set, reference numeral 12 denotes a plant, and reference numeral 13 denotes a donut-shaped bench.

In this case, for example, the route calculation unit 109 calculates a linear route since there is no congestion area that is an obstacle for the user vehicle 3*a* and the delivery vehicle 4*a*. Similarly, for example, the route calculation unit 109 calculates a linear route since there is no congestion area that is an obstacle for the user vehicle 3*b* and the delivery vehicle 4*b*. Similarly, for example, the route calculation unit 109 calculates a linear route since there is no congestion area that is an obstacle for the user vehicle 3*c* and the delivery vehicle 4*c*.

On the other hand, for example, the route calculation unit 109 calculates a route that avoids this congestion area since there is a congestion area that is an obstacle for the user vehicle 3*d* and the delivery vehicle 4*d*.

Note that FIG. 12 assumes a case where goods are goods that do not require explanation at a time of delivery, and the follow-up-from-behind or the side-by-side parallel traveling is selected as the parallel traveling style. Furthermore, the parallel traveling control unit 110 controls parallel traveling of the user vehicles 3*a* to 3*d* and the delivery vehicles 4*a* to 4*c* depending on routes calculated by the route calculation unit 109 as described above.

Next, the delivery confirmation unit 111 confirms that delivery of the goods has been completed (step ST708).

In this step ST708, when the delivery confirmation unit 111 confirms that delivery of the goods has been completed, the sequence is ended.

At this time, for example, after accepting goods, the user may send to the central management device 1 an acceptance confirmation notification using the terminal such as the portable terminal held by the user. In this case, the delivery confirmation unit 111 can confirm completion of delivery of the goods by accepting this acceptance confirmation notification.

Furthermore, for example, a sensor such as a load sensor or an image sensor that can detect whether or not the goods are loaded may be attached to the delivery vehicle 4, and the sensor may be configured to send a detection result to the central management device 1. In this case, the delivery confirmation unit 111 can confirm completion of delivery of the goods by confirming a change corresponding to whether or not there are goods on the basis of the detection result of the above sensor.

Furthermore, when the delivery confirmation unit 111 confirms in step ST708 that delivery of the goods is not completed, that is, that delivery of the goods has failed, the sequence returns to step ST705 to instruct the parallel traveling zone congestion situation detection unit 108 to perform detection again. Subsequently, the central management device 1 causes the user vehicle 3 and the delivery vehicle 4 to deliver the goods again.

At this time, when, for example, failing in accepting the goods, the user may send to the central management device 1 an acceptance failure notification using the terminal such as the portable terminal held by the user. In this case, the delivery confirmation unit 111 can confirm a failure of delivery of the goods by accepting this acceptance failure notification.

Furthermore, for example, a sensor such as a load sensor or an image sensor that can detect whether or not the goods are loaded may be attached to the delivery vehicle 4, and the sensor may be configured to send a detection result to the central management device 1. In this case, the delivery confirmation unit 111 can confirm the failure of delivery of the goods when it is not confirmed on the basis of the detection result of the above sensor when a change corresponding to whether or not there are goods is not confirmed even after a certain period of time passes.

Thus, the central management device 1 according to Embodiment 1 calculates the routes in which the user vehicle 3 and the delivery vehicle 4 travel in parallel in the parallel traveling zone 6, and controls parallel traveling of the user vehicle 3 and the delivery vehicle 4 depending on these routes to deliver the goods. Consequently, the central management device 1 according to Embodiment 1 can calculate optimal providing routes in response to an increase or a decrease of a demand without fixing a providing place of goods, and deliver the goods while the vehicles travel in parallel without stopping once. As a result, the central management device 1 according to this Embodiment 1 can eliminate a waiting time and a waiting traffic jam, freely change delivery space, and increase an operation rate compared to a conventional technique.

Note that the system disclosed in Patent Literature 1 delivers food and beverages using the unmanned aerial vehicle. This system can implement a delivery service with a less waiting time. However, even according to this system, a user needs to stop a vehicle once, and accept food and beverages.

By contrast with this, according to the parallel traveling management system according to Embodiment 1, the delivery vehicle 4 can travel in parallel to the user vehicle 3 and deliver the goods without stopping once. Hence, the central management device 1 according to this Embodiment 1 reduces a time for delivery work of goods compared to the conventional technique.

Furthermore, the parallel traveling management system according to Embodiment 1 delivers goods using the delivery vehicle 4, so that it is possible to deliver the goods even in bad weather compared to a case where an unmanned aerial vehicle is used.

Furthermore, the parallel traveling management system according to Embodiment 1 delivers goods by using and causing the delivery vehicle 4 that can autonomously travel to travel in parallel to the user vehicle 3, so that it is unnecessary to secure a place at which the delivery vehicle 4 stops once and it is possible to avoid a waiting traffic jam compared to the case where the unmanned aerial vehicle is used.

Furthermore, the parallel traveling management system n according to Embodiment 1 delivers goods using the delivery vehicle 4, so that there is a low risk that the goods are damaged or deteriorate and it is unnecessary to excessively pack the goods compared to the case where the unmanned aerial vehicle is used.

Furthermore, the central management device 1 according to Embodiment 1 enables the user vehicle 3 to accept goods while moving without stopping, so that the user can accept the goods without feeling a waiting time.

Furthermore, the central management device 1 according to Embodiment 1 provides a certain degree of freedom at a delivery place of goods. Consequently, the central management device 1 according to this Embodiment 1 can avoid congestion at a time of delivery, and increase operation efficiency to provide the goods.

Furthermore, in the case where, for example, the providing facility 2 is a prescription counter of a hospital, the central management device 1 according to Embodiment 1 can control traveling without people staying, and consequently provides an effect of an infectious disease preventive measure. Note that, although the case where the providing facility 2 is the prescription counter of the hospital has been described, the other providing facilities 2 can also provide the same effects as the above effect.

Furthermore, in the case where, for example, the providing facility 2 is the prescription counter of the hospital, the central management device 1 according to Embodiment 1 can deliver goods using the delivery vehicle 4 that is a robot, and provides an effect of an infectious disease preventive measure. Note that, although the case where the providing facility 2 is the prescription counter of the hospital has been described, the other providing facilities 2 can also provide the same effects as the above effect.

Furthermore, in a case where, for example, the providing facility 2 is a food court, the central management device 1 according to Embodiment 1 can avoid congestion of delivery of goods at a peak time such as a lunch time or a dinner time.

Furthermore, in a case where, for example, the providing facility 2 is a store of a large commercial facility, according to the central management device 1 according to Embodiment 1, the delivery vehicle 4 automatically stores goods ordered in advance by the user in the storage of the user vehicle 3, so that the user can omit a labor required to deliver the goods. As a result, the user can spend the omitted time for a shopping time of other products or the like.

Note that the case has been described above where the parallel traveling management device is applied to the central management device 1 that is a different device from the user vehicle 3 and the delivery vehicle 4. However, the present disclosure is not limited to this, and the parallel traveling management device may be applied to the user vehicle 3 or the delivery vehicle 4.

Furthermore, the case has been described above where all components included in the parallel traveling management device are applied to one device. However, the present disclosure is not limited to this, and the components included in the parallel traveling management device are divided into and applied to two or more devices of the central management device 1, the user vehicle 3, or the delivery vehicle 4.

As described above, according to this Embodiment 1, the parallel traveling management system includes the order information acquisition unit 104 that acquires information indicating an order of goods, the user vehicle arrival detection unit 106 that detects that the user vehicle 3 has arrived at the parallel traveling zone 6, the parallel traveling zone congestion situation detection unit 108 that detects a congestion situation of the parallel traveling zone 6 when the user vehicle arrival detection unit 106 detects that the user vehicle 3 has arrived at the parallel traveling zone 6, the route calculation unit 109 that calculates on the basis of a detection result of the parallel traveling zone congestion situation detection unit 108 the traveling route of the user vehicle 3 and the traveling route of the delivery vehicle 4 at a time at which the goods indicated by the information acquired by the order information acquisition unit 104 are delivered, and the parallel traveling control unit 110 that controls parallel traveling of the user vehicle 3 and the delivery vehicle 4 on the basis of a calculation result of the route calculation unit 109, and instruct the delivery of the goods. Consequently, the parallel traveling management system according to Embodiment 1 enables acceptance of goods while vehicles move without stopping the vehicles once.

Lastly, hardware configuration examples of the central management device 1 according to Embodiment 1 will be described with reference to FIG. 13.

Figure 13A:
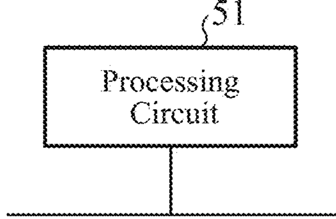
FIGS. 13A and 13B are diagrams illustrating hardware configuration examples of the central management device according to Embodiment 1.
Figure 13B:
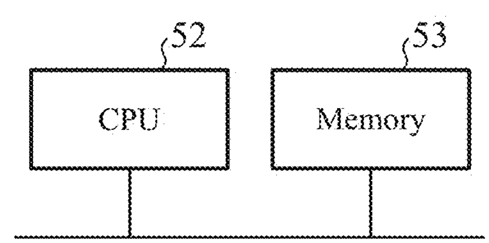

The functions of the communication unit 101, the parallel traveling zone information acquisition unit 102, the delivery vehicle information acquisition unit 103, the order information acquisition unit 104, the user vehicle information acquisition unit 105, the user vehicle arrival detection unit 106, the delivery vehicle designation unit 107, the parallel traveling zone congestion situation detection unit 108, the route calculation unit 109, the parallel traveling control unit 110, and the delivery confirmation unit 111 of the central management device 1 are implemented by a processing circuit 51. The processing circuit 51 may be dedicated hardware as illustrated in FIG. 13A, or may be a CPU (that is also referred to as a Central Processing Unit, a central processing device, a processing device, an arithmetic operation device, a microprocessor, a microcomputer, a processor, or a Digital Signal Processor (DSP)) 52 that executes programs stored in a memory 53 as illustrated in FIG. 13B.

In a case where the processing circuit 51 is the dedicated hardware, the processing circuit 51 corresponds to, for example, a single circuit, a composite circuit, a programmed processor, a parallel-programmed processor, an Application Specific Integrated Circuit (ASIC), a Field-Programmable Gate Array (FPGA), or a combination thereof. The function of each of the communication unit 101, the parallel traveling zone information acquisition unit 102, the delivery vehicle information acquisition unit 103, the order information acquisition unit 104, the user vehicle information acquisition unit 105, the user vehicle arrival detection unit 106, the delivery vehicle designation unit 107, the parallel traveling zone congestion situation detection unit 108, the route calculation unit 109, the parallel traveling control unit 110, and the delivery confirmation unit 111 may be implemented by the processing circuit 51, or the functions of the units may be collectively implemented by the processing circuit 51.

In a case where the processing circuit 51 is the CPU 52, the functions of the communication unit 101, the parallel traveling zone information acquisition unit 102, the delivery vehicle information acquisition unit 103, the order information acquisition unit 104, the user vehicle information acquisition unit 105, the user vehicle arrival detection unit 106, the delivery vehicle designation unit 107, the parallel traveling zone congestion situation detection unit 108, the route calculation unit 109, the parallel traveling control unit 110, and the delivery confirmation unit 111 are implemented by software, firmware, or a combination of software and firmware. The software and the firmware are described as programs, and stored in the memory 53. The processing circuit 51 implements the function of each function unit by reading and executing the programs stored in the memory 53. That is, the central management device 1 includes the memory 53 that stores programs that are executed by the processing circuit 51 in such a way that each step illustrated in, for example, FIG. 7 is executed. Furthermore, these programs cause a computer to execute a procedure and a method of the communication unit 101, the parallel traveling zone information acquisition unit 102, the delivery vehicle information acquisition unit 103, the order information acquisition unit 104, the user vehicle information acquisition unit 105, the user vehicle arrival detection unit 106, the delivery vehicle designation unit 107, the parallel traveling zone congestion situation detection unit 108, the route calculation unit 109, the parallel traveling control unit 110, and the delivery confirmation unit 111. Here, the memory 53 corresponds to, for example, a non-volatile or volatile semiconductor memory such as a Random Access Memory (RAM), a Read Only Memory (ROM), a flash memory, an Erasable Programmable Read Only Memory (EPROM), or an Electrically EPROM (EEPROM), a magnetic disk, a flexible disk, an optical disk, a compact disk, a mini disk, a Digital Versatile Disc (DVD), and the like.

Note that the functions of the communication unit 101, the parallel traveling zone information acquisition unit 102, the delivery vehicle information acquisition unit 103, the order information acquisition unit 104, the user vehicle information acquisition unit 105, the user vehicle arrival detection unit 106, the delivery vehicle designation unit 107, the parallel traveling zone congestion situation detection unit 108, the route calculation unit 109, the parallel traveling control unit 110, and the delivery confirmation unit 111 may be partially implemented by dedicated hardware and partially implemented by software or firmware. For example, the function of the communication unit 101 can be implemented by the processing circuit 51 that is the dedicated hardware, and the functions of the parallel traveling zone information acquisition unit 102, the delivery vehicle information acquisition unit 103, the order information acquisition unit 104, the user vehicle information acquisition unit 105, the user vehicle arrival detection unit 106, the delivery vehicle designation unit 107, the parallel traveling zone congestion situation detection unit 108, the route calculation unit 109, the parallel traveling control unit 110, and the delivery confirmation unit 111 can be implemented by the processing circuit 51 by reading and executing the programs stored in the memory 53.

Thus, the processing circuit 51 can implement each of the above-described functions as hardware, software, firmware, or a combination thereof.

Note that it is possible to modify random components in the embodiment, or omit random components in the embodiment.

INDUSTRIAL APPLICABILITY

Consequently, the parallel traveling management device according to the present disclosure is suitable for use as a parallel traveling management device or the like that enables acceptance of goods while vehicles are moving without stopping once, and delivers the goods by controlling parallel traveling of the vehicles.

REFERENCE SIGNS LIST

1: central management device, 2: providing facility, 3: user vehicle, 4: delivery vehicle, 5: parallel traveling zone device, 6: parallel traveling zone, 7: goods, 8: person, 9: bench, 10: congestion area, 11: table set, 12: plant, 13: donut-shaped bench, 51: processing circuit, 52: CPU, 53: memory, 101: communication unit, 102: parallel traveling zone information acquisition unit, 103: delivery vehicle information acquisition unit, 104: order information acquisition unit, 105: user vehicle information acquisition unit, 106: user vehicle arrival detection unit, 107: delivery vehicle designation unit, 108: parallel traveling zone congestion situation detection unit, 109: route calculation unit, 110: parallel traveling control unit, 111: delivery confirmation unit, 201: communication unit, 202: order acceptance unit, 301: communication unit, 302: extra-vehicle sensor, 303: traveling control unit, 401: communication unit, 402: extra-vehicle sensor, 403: traveling control unit, 501: communication unit, 502: roadside sensor

The invention claimed is:

1. A parallel traveling management device comprising:

a processor; and a memory storing a program, upon being executed by the processor, to perform a process:

to acquire information indicating an order of goods;

to detect that a user vehicle has arrived at a parallel traveling zone;

to detect a congestion situation of the parallel traveling zone when the process detects that the user vehicle has arrived at the parallel traveling zone;

to calculate, on a basis of the congestion situation of the parallel traveling zone at which the user vehicle has arrived, a traveling route of the user vehicle and a traveling route of a delivery vehicle at a time at which the goods indicated by the information indicating the order of the goods are delivered;

to control parallel traveling of the user vehicle on a basis of the traveling route of the user vehicle and the delivery vehicle on a basis of the traveling route of the delivery vehicle in an autonomous driving; and to instruct delivery of the goods, wherein the process dynamically controls the parallel traveling of the user vehicle and the delivery vehicle on a basis of one or more of:

a detection result of an extra-vehicle sensor provided to the user vehicle and configured to be able to detect a situation of surroundings, a detection result of an extra-vehicle sensor provided to the delivery vehicle and configured to be able to detect a situation of surroundings, and a detection result of a roadside sensor provided in the parallel traveling zone and configured to be able to detect a situation in the parallel traveling zone.

2. The parallel traveling management device according to claim 1, wherein the process further calculates, on the basis of the congestion situation of the parallel traveling zone at which the user vehicle has arrived, a traveling speed of the user vehicle and traveling speed of the delivery vehicle at the time at which the goods indicated by the information indicating the order of the goods by the process are delivered.

3. The parallel traveling management device according to claim 1, wherein the process performs the detection of the congestion situation of the parallel traveling zone at which the user vehicle has arrived on a basis of one or more of:

the detection result of the roadside sensor, and the detection result of the extra-vehicle sensor provided to the user vehicle.

4. The parallel traveling management device according to claim 1, wherein the process further confirms whether the delivery of the goods has been completed after the control of parallel traveling, wherein, when the process confirms that the delivery of the goods has failed, the process detects again the congestion situation of the parallel traveling zone.

5. The parallel traveling management device according to claim 1, wherein the parallel traveling includes a face-to-face parallel traveling style where the user vehicle and the delivery vehicle travel in parallel facing each other.

6. The parallel traveling management device according to claim 1, wherein the parallel traveling includes a follow-up-from-behind parallel traveling style where the delivery vehicle travels in parallel following the user vehicle from behind.

7. The parallel traveling management device according to claim 1, wherein the parallel traveling includes a side-by-side parallel traveling style where the user vehicle and the delivery vehicle travel in parallel side-by-side.

8. The parallel traveling management device according to claim 1, wherein the information indicating the order of the goods includes information indicating a selected parallel traveling style.

9. The parallel traveling management device according to claim 8, wherein the selected parallel traveling style is selected from two or more of:

a face-to-face parallel traveling style where the user vehicle and the delivery vehicle travel in parallel facing each other, a follow-up-from-behind parallel traveling style where the delivery vehicle travels in parallel following the user vehicle from behind, and a side-by-side parallel traveling style where the user vehicle and the delivery vehicle travel in parallel side-by-side.

10. The parallel traveling management device according to claim 1, wherein a style of the parallel traveling is determined by a type of the goods indicated by the information indicating the order of the goods.

11. The parallel traveling management device according to claim 10, wherein the style of the parallel traveling is selected from two or more of:

a face-to-face parallel traveling style where the user vehicle and the delivery vehicle travel in parallel facing each other, a follow-up-from-behind parallel traveling style where the delivery vehicle travels in parallel following the user vehicle from behind, and a side-by-side parallel traveling style where the user vehicle and the delivery vehicle travel in parallel side-by-side.

12. The parallel traveling management device according to claim 8, wherein the traveling route of the user vehicle and the traveling route of the delivery vehicle are calculated on a basis of the selected parallel traveling style.

13. The parallel traveling management device according to claim 9, wherein the traveling route of the user vehicle and the traveling route of the delivery vehicle are calculated on a basis of the selected parallel traveling style.

14. The parallel traveling management device according to claim 1, wherein the parallel traveling zone is a zone in which the user vehicle and the delivery vehicle can travel in parallel.

15. The parallel traveling management device according to claim 1, wherein the parallel traveling zone is a zone in which the goods can be delivered between the user vehicle and the delivery vehicle.

16. A parallel traveling management method comprising:

acquiring information indicating an order of goods;

detecting that a user vehicle has arrived at a parallel traveling zone;

detecting a congestion situation of the parallel traveling zone when the method detects that the user vehicle has arrived at the parallel traveling zone;

calculating, on a basis of the congestion situation of the parallel traveling zone at which the user vehicle has arrived, a traveling route of the user vehicle and a traveling route of a delivery vehicle at a time at which the goods indicated by the information indicating the order of the goods are delivered;

controlling parallel traveling of the user vehicle on a basis of the traveling route of the user vehicle and the delivery vehicle on a basis of the traveling route of the delivery vehicle in an autonomous driving;

instructing delivery of the goods; and dynamically controlling the parallel traveling of the user vehicle and the delivery vehicle on a basis of one or more of:

a detection result of an extra-vehicle sensor provided to the user vehicle and configured to be able to detect a situation of surroundings, a detection result of an extra-vehicle sensor provided to the delivery vehicle and configured to be able to detect a situation of surroundings, and a detection result of a roadside sensor provided in the parallel traveling zone and configured to be able to detect a situation in the parallel traveling zone.

* * * * *